(12) United States Patent
Mohammadi

(10) Patent No.: US 11,378,149 B2
(45) Date of Patent: Jul. 5, 2022

(54) METHOD OF MANUFACTURING A DAMPER TUBE

(71) Applicant: Tenneco Automotive Operating Company Inc., Lake Forest, IL (US)

(72) Inventor: Amirahmad Mohammadi, Heverlee (BE)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 0 days.

(21) Appl. No.: 17/147,066

(22) Filed: Jan. 12, 2021

(65) Prior Publication Data

US 2021/0131516 A1    May 6, 2021

Related U.S. Application Data

(62) Division of application No. 16/045,271, filed on Jul. 25, 2018.

(51) Int. Cl.
  *B21D 53/88*  (2006.01)
  *F16F 9/32*  (2006.01)
  *F16F 9/54*  (2006.01)

(52) U.S. Cl.
  CPC ............ *F16F 9/3242* (2013.01); *B21D 53/88* (2013.01); *F16F 9/3271* (2013.01); *F16F 9/54* (2013.01)

(58) Field of Classification Search
  CPC .......... F16F 9/3242; F16F 9/3271; F16F 9/54; B21D 41/04; B21D 41/045; B21D 11/10; B21D 11/08; B21D 5/16; B21D 39/04; B21D 19/12; B21F 1/06; Y10T 29/49929; Y10T 29/49968

See application file for complete search history.

(56) References Cited

U.S. PATENT DOCUMENTS

| | | | |
|---|---|---|---|
| 3,942,232 A * | 3/1976 | McGuire | G21C 3/041 29/890.14 |
| 3,972,353 A | 8/1976 | McGuire | |
| 9,562,630 B2 | 2/2017 | Daton-Lovett | |
| 2013/0161141 A1 | 6/2013 | Maegawa et al. | |

FOREIGN PATENT DOCUMENTS

| | | |
|---|---|---|
| DE | 833001 | 3/1952 |
| DE | 10004124 | 5/2001 |
| GB | 1082757 A * | 9/1967 |

* cited by examiner

*Primary Examiner* — Nirvana Deonauth
(74) *Attorney, Agent, or Firm* — McGarry Bair PC

(57) ABSTRACT

A method of manufacturing a damper tube is provided. The method includes providing a tube having a first end and a second end opposite to the first end. The method includes providing a reinforcing insert, at least partly, within the first end of the tube. The method includes flattening a portion of the first end of the tube. The method also includes bending at least one of the reinforcing insert and the flattened portion of the first end of the tube into a loop. The method further includes connecting an edge of the loop to the tube.

16 Claims, 11 Drawing Sheets

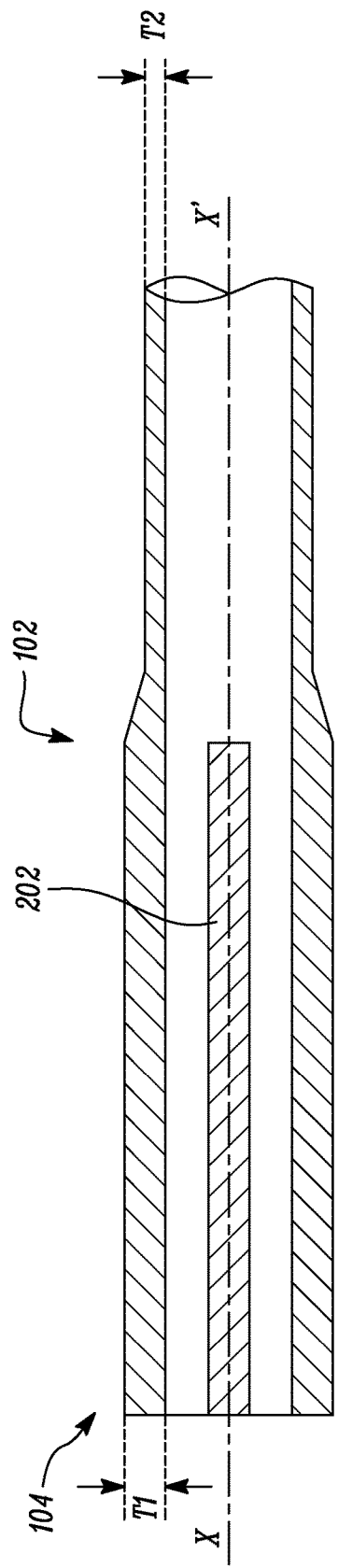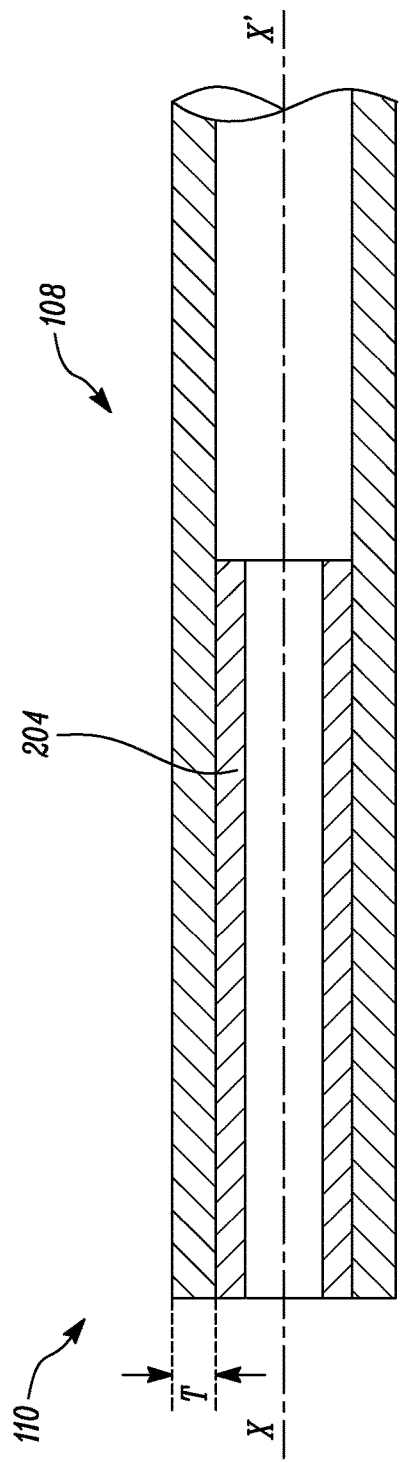
FIG. 2A
FIG. 2B

METHOD OF MANUFACTURING A DAMPER TUBE

CROSS-REFERENCE TO RELATED APPLICATIONS

This application claims priority to and is a divisional application of U.S. patent application Ser. No. 16/045,271, filed on Jul. 25, 2018, now U.S. Pat. No. 10,920,847, issued Feb. 16, 2021, which is hereby incorporated herein by reference in its entirety.

TECHNICAL FIELD

The present disclosure relates to a method of manufacturing a damper tube. More particularly, the present disclosure relates to a method for manufacturing the damper tube for a suspension system.

BACKGROUND

A damper tube is generally used as a base assembly for a suspension system, such as a shock absorber. The damper tube may be manufactured using one or more components, joints, and/or manufacturing processes. As such, the manufacturing of the damper tube may be complex, time intensive, labor intensive, and expensive. Also, a material of construction used for the damper assembly may add considerable weight to the damper tube. Further, a change in a design of the damper tube may demand a change in the manufacturing process. To achieve this, alternative manufacturing process may have to be employed based on the new design.

In some situations, automated manufacturing processes may be employed which may relieve the operator and increase throughput, thus, improving production rate and production costs. Moreover, a material of construction and specific techniques used to process the material may significantly govern the production costs. Therefore, both the material and the processes involved may need to be considered for reducing the complexity and costs. Conventional methods of manufacturing the damper tube may include multiple components and/or manufacturing steps increasing complexity of the manufacturing process, increasing investment cost, reducing logistic flow, and making the damper tube heavy and expensive. Hence, there is a need for an improved method of manufacturing the damper tube to reduce complexity, weight, and costs.

Given description covers one or more above mentioned problems and discloses a method and a system to solve the problems.

SUMMARY

In an aspect of the present disclosure, a method of manufacturing a damper tube is provided. The method includes providing a tube having a first end and a second end opposite to the first end. The method includes providing a reinforcing insert, at least partly, within the first end of the tube. The method includes flattening a portion of the first end of the tube. The method also includes bending at least one of the reinforcing insert and the flattened portion of the first end of the tube into a loop. The method further includes connecting an edge of the loop to the tube.

Other features and aspects of this disclosure will be apparent from the following description and the accompanying drawings.

BRIEF DESCRIPTION OF DRAWINGS

FIGS. 2A and 2B illustrate cross sectional views of exemplary reinforcing inserts disposed within the exemplary tubes, according to an aspect of the present disclosure;

DETAILED DESCRIPTION

Wherever possible, the same reference numbers will be used throughout the drawings to refer to same or like parts. The present disclosure relates to a method of manufacturing a damper tube 502, 508 (shown in FIGS. 5A, 5B, 5C, 5D and 5E). The damper tube 502, 508 may be a portion of a base or strut assembly (not shown) of a shock absorber (not shown) used in a suspension system (not shown). The suspension system may be employed for shock dampening in various applications, such as automotive, aviation, aerospace, heavy machinery, marine, transportation, industrial, and the like. The damper tube 502, 508 may be adapted to enclose one or more components of the shock absorber, such as a piston, a volume of a working fluid, seals, and the like.

Figure 1A:
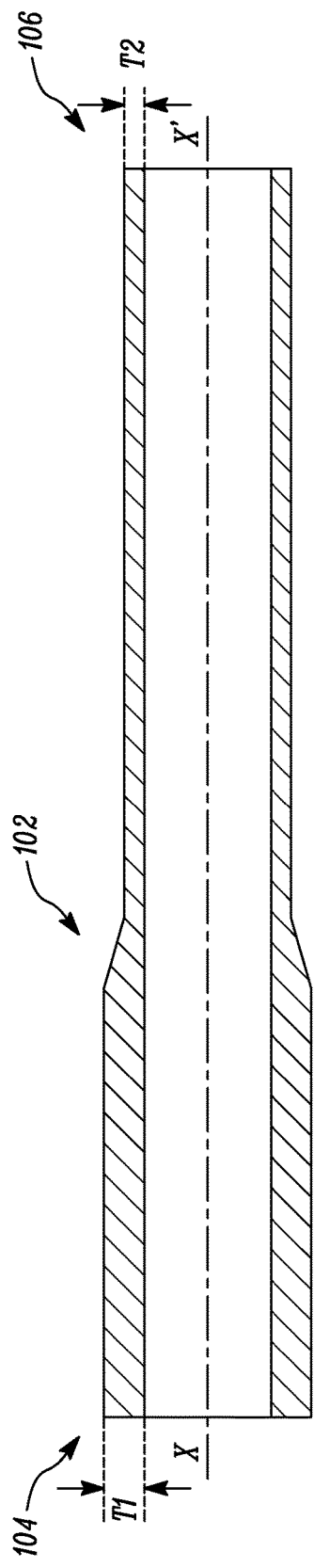
FIGS. 1A and 1B illustrate cross sectional views of exemplary tubes, according to an aspect of the present disclosure.
Figure 1B:
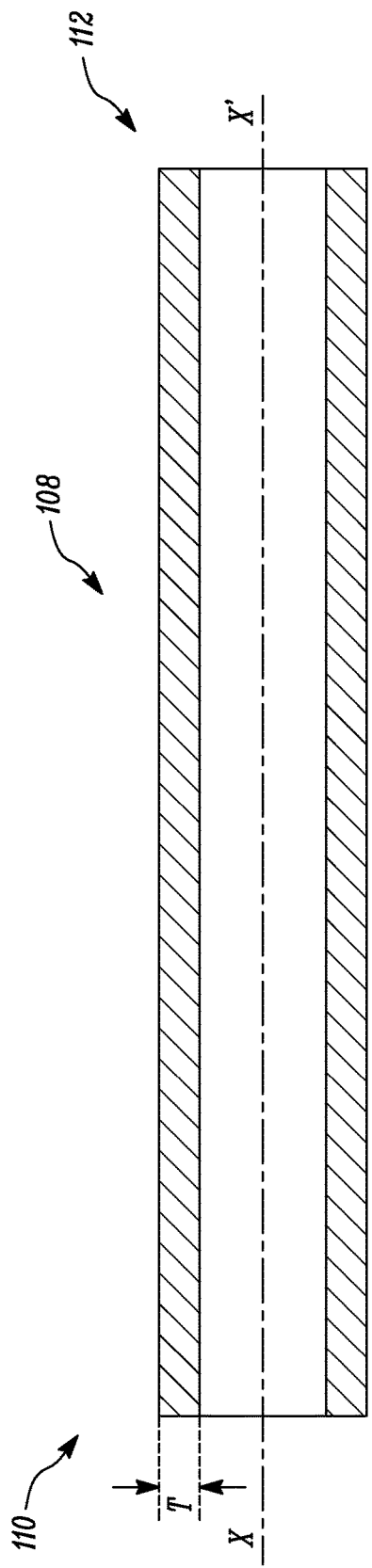

Referring to FIG. 1A, a cross sectional view of an exemplary tube 102 is illustrated. The tube 102 has a substantially hollow and elongated configuration defining a central axis X-X'. The tube 102 includes a first end 104 and a second end 106. The second end 106 is opposite the first end 104. Also, in the illustrated embodiment, the tube 102 has a varying thickness along a length thereof. More specifically, the tube 102 has a first thickness "T1" at the first end 104 and a second thickness "T2" at the second end 106. In the illustrated embodiment, the first thickness "T1" is greater than the second thickness "T2". In other embodiments, the tube 102 may include multiple thicknesses along the length thereof. In other embodiments, as shown in FIG. 1B, the tube 108 may have a constant thickness "T" along the length between the first end 110 and the second end 112 thereof. The tube 102, 108 may be made of a material, such as a metal, an alloy, and the like. The method of manufacturing the damper tube 502 will be now explained with reference to the tube 108 having constant thickness "T" for the purpose of clarity and explanation. It should be noted that, in other embodiments, the damper tube 508 may be manufactured using the tube 102 with the varying thickness without limiting the scope of the disclosure.

Referring to FIG. 2A, a reinforcing insert 202 is provided, at least partly, within the first end 104 of the tube 102. In the illustrated embodiment, the reinforcing insert 202 has a substantially planar shape. Accordingly, the reinforcing insert 202 may include a metal strip, a portion of sheet metal, and the like. In other embodiments, as shown in FIG. 2B, the reinforcing insert 204 may have a substantially cylindrical shape. In the illustrated embodiment, the reinforcing insert 204 has a substantially hollow, tubular shape. In other embodiments, the reinforcing insert 204 may have a substantially solid, rod like shape. The reinforcing insert 202, 204 may be made of a reinforcing material, such as a metal, an alloy, and the like. The method of manufacturing the damper tube 502 will be further explained with reference to the reinforcing insert 202 having the planar shape for the purpose of clarity and explanation. It should be noted that, in other embodiments, the damper tube 502 may be manufactured using the reinforcing insert 204 having the cylindrical shape without limiting the scope of the disclosure.

Figure 3A:
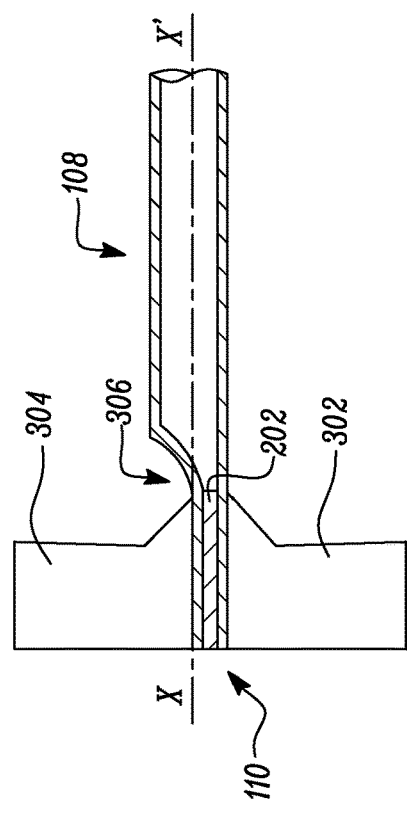
FIGS. 3A, 3B, 3C, 3D, and 3E illustrate different steps of flattening the exemplary tube, according to an aspect of the present disclosure.
Figure 3B:
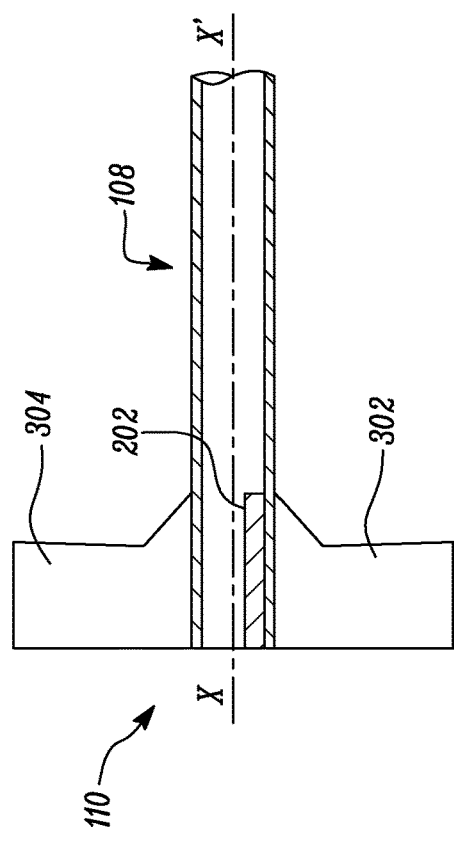

Referring to FIGS. 3A and 3B, the first end 110 of the tube 108 having the reinforcing insert 202 is flattened. More specifically, as shown in FIG. 3A, the first end 110 of the tube 108 along with the reinforcing insert 202 is placed between a flattening die 302 and a flattening press 304. The flattening die 302 and the flattening press 304 may be configured based on the thickness and a diameter of the tube 108 and/or of the reinforcing insert 202. Further, as shown in FIG. 3B, the flattening press 304 may exert pressure on the first end 110 of the tube 108 to flatten a portion 306 of the first end 110 of the tube 108, such that the tube 108 contacts the reinforcing insert 202. As such, the reinforcing insert 202 is sandwiched between the flattened portion 306 of the first end 110 of the tube 108.

Figure 3C:
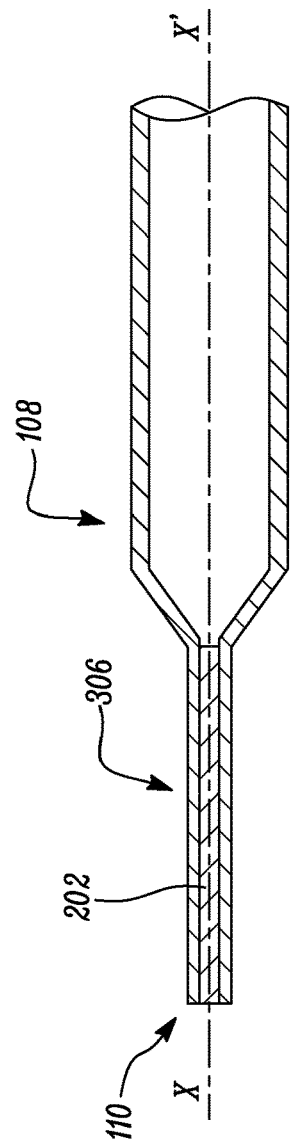

In the illustrated embodiment, the first end 110 of the tube 108 is flattened in a manner, such that the flattened portion 306 is disposed at an offset "F" with respect to the central axis X-X' of the tube 108. In other embodiments, as shown in FIG. 3C, the first end 110 of the tube 108 may be flattened in a manner, such that the flattened portion 306 is aligned with respect to the central axis X-X' of the tube 108. In some embodiments, when the reinforcing insert 204 may have the cylindrical shape as described in FIG. 2B, the reinforcing insert 204 may be flattened along with the first end 110 of the tube 108.

Figure 3E:
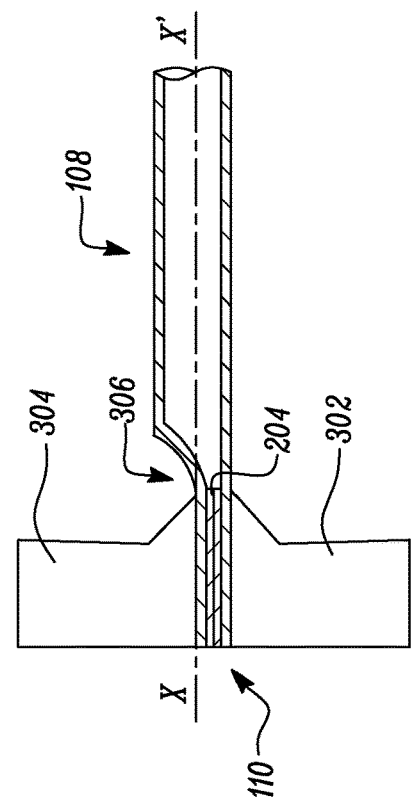
Figure 3D:
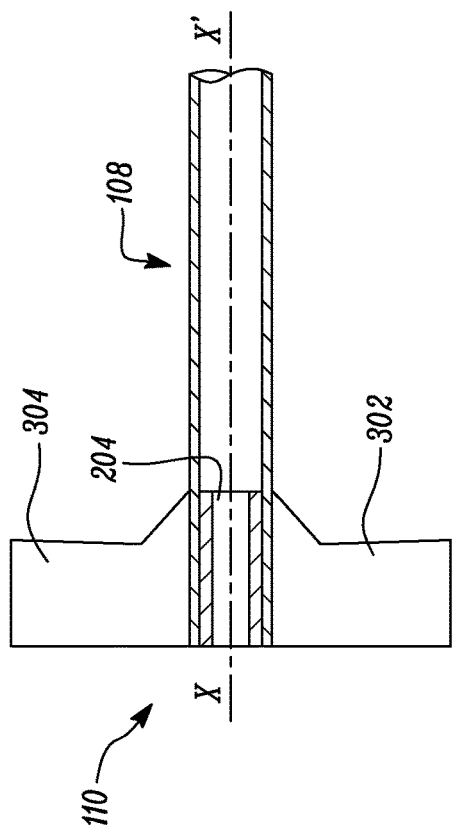

More specifically, as shown in FIG. 3D, the first end 110 of the tube 108 along with the reinforcing insert 204 is placed between the flattening die 302 and the flattening press 304. Further, as shown in FIG. 3E, the flattening press 304 may exert pressure on the first end 110 of the tube 108 to flatten the portion 306 of the first end 110 of the tube 108 along with the reinforcing insert 204. As such, the reinforcing insert 204 is flattened and sandwiched between the flattened portion 306 of the first end 110 of the tube 108.

It should be noted that, in some embodiments, an additional trimming process (not shown) may be employed using a dedicated set of dies and/or tools (not shown) in order to trim and/or shape one or more end corners and/or an end boundary of the flattened portion 306 of the tube 108. In such a situation, the trimmed portion of the flattened portion 306 of the tube 108 may be welded to provide sealing and corrosion resistance to the flattened portion 306 of the tube 108. In some embodiments, a thickness of the flattened portion 306 of the tube 108 may be increased prior to flattening using known manufacturing processes. Also, it should be noted that, in some embodiments, as shown in FIGS. 8A to 8D, the portion 306 of the first end 110 of the tube 108 may be partially flattened without the reinforcing insert 202, such that the reinforcing insert 202 may be inserted later in the partially flattened portion 306. The manufacturing process will be explained later in more detail with reference to FIGS. 8A and 8D.

Figures 4A, 4B, 4C:
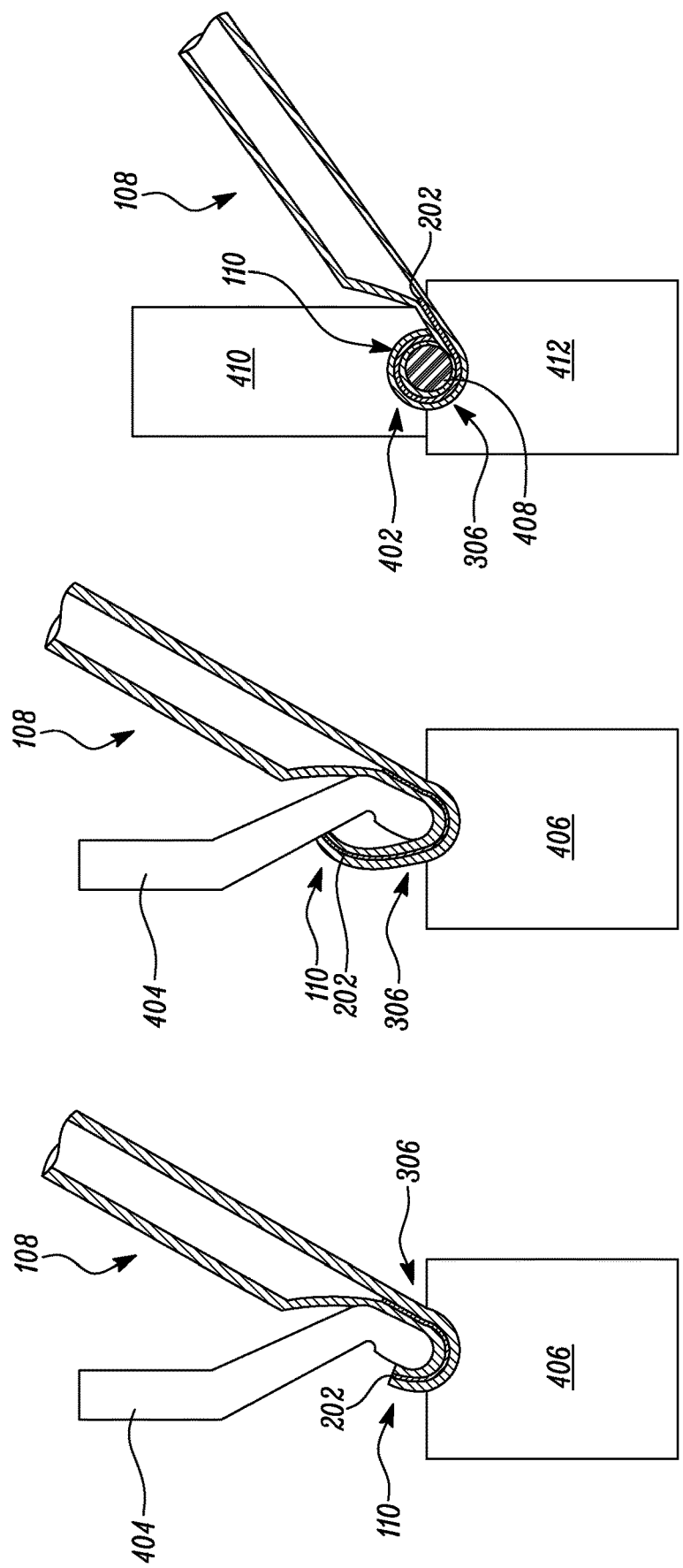
FIGS. 4A, 4B, and 4C illustrate different steps of bending the exemplary reinforcing insert and the exemplary tube, according to an aspect of the present disclosure.

Referring to FIGS. 4A to 4C, the reinforcing insert 202 and the flattened portion 306 of the tube 108 are bent into a loop 402. More specifically, as shown in FIGS. 4A and 4B, a first tool 404 and a first die 406 are provided in contact with the reinforcing insert 202 and the flattened portion 306 of the first end 110 of the tube 108. The first tool 404 and the first die 406 are adapted to partly bend the reinforcing insert 202 and the flattened portion 306 of the tube 108. The first tool 404 may be a punch tool, such as a gooseneck punch or any other tool adapted to bend the reinforcing insert 202 and the flattened portion 306 of the tube 108. It should be noted that, in some embodiments, the first tool 404 and the first die 406 shown in each of the FIGS. 4A and 4B may include varying configurations in order to enable progressive bending of the reinforcing insert 202 and the flattened portion 306 of the tube 108.

Further, as shown in FIG. 4C, the first tool 404 and the first die 406 are replaced with a second tool 408, a curling press 410, and a curling die 412. More specifically, the second tool 408, the curling press 410, and the curling die 412 are provided in contact with the partly bent reinforcing insert 202 and the flattened portion 306 of the tube 108 of FIG. 4B. The second tool 408, the curling press 410, and the curling die 412 are adapted to bend the partly bent reinforcing insert 202 and the flattened portion 306 of the first end 110 of the tube 108 into the loop 402.

The second tool 408 may be a curling tool or any other tool adapted to provide support to the flattened portion 306 of the tube 108 during curling of the reinforcing insert 202 and the flattened portion 306 of the tube 108 into the loop 402. In some embodiments, the second tool 408 may be a bushing (not shown) used in the shock absorber. The bushing may provide a stiff connection between a vehicle chassis and the shock absorber. In a situation when the bushing may include an outer sleeve (not shown), such as a metallic rim, the bushing may provide reinforcement and support to the flattened portion 306 of the tube 108 during the curling process.

Further, the second tool 408 may be removed from the loop 402 to complete the bending process. It should be noted that the tools, the presses, the dies, and the bending process, described herein with reference to FIGS. 4A to 4C are merely exemplary and may vary based on application requirements. For example, in some embodiments, the bending process may be completed in a single step by using a single set of a tool and a die. In other embodiments, the bending process may be completed in multiple steps by using multiple sets of tools and dies, such as by forming multiple small bends adjacent to one another in the flattened portion 306 of the tube 108 by pushing the flattened portion 306 of the tube 108 against the first tool 404 or vice versa. Also, it should be noted that, although the bending and curling process is described herein with reference to the reinforcing insert 202, the reinforcing insert 204 and the flattened portion 306 of the tube 108 may be bent and curled into the loop 402 in a manner similar to that described with reference to FIGS. 4A to 4C.

It should be noted that, in the illustrated embodiment, each of the flattening die 302, the flattening press 304, the first die 406, the curling press 410, and the curling die 412 is exemplarily shown in a substantially vertical orientation. In other embodiments, one or more of the flattening die 302, the flattening press 304, the first die 406, the curling press 410, and the curling die 412 may be oriented in any other manner, such as inclined or horizontally. Also, the flattening die 302 and the flattening press 304 may be configured in a manner to perform on-center or off-center flattening of the portion 306 of the tube 108 with respect to the central axis X-X', based on application requirements.

In some embodiments, the reinforcing insert 202 and the flattened portion 306 of the tube 108 may be heated prior to or during the bending process. The heating of the reinforcing insert 202 and the flattened portion 306 of the tube 108 may limit material failure due to straining and/or plastic deformation and may improve formability. Also, the heating of the reinforcing insert 202 and the flattened portion 306 of the tube 108 when employed in combination with the second tool 408 during the bending process may limit spring back effect in the loop 402. The heat may be applied using a heating method, such as a gas torch heating, laser assisted heating and bending, induction heating, furnace heating, infrared lamp heating, and the like.

In some embodiments, the spring back effect in the loop 402 may be limited by using spring back compensation techniques, such as forming, measuring, and compensation. In some embodiments, the spring back effect in the loop 402 may be limited by using laser assisted in-process measuring of a bending angle in order to allow in-process monitoring and correction of the bending angle. Also, the reinforcing insert 202 improves strength and stiffness of the loop 402 under dynamic and/or static loading conditions. In some embodiments, the variable thickness of the tube 102 (as shown in FIG. 1B) along with the reinforcing insert 202 may add structural rigidity to the loop 402.

Figure 5A:
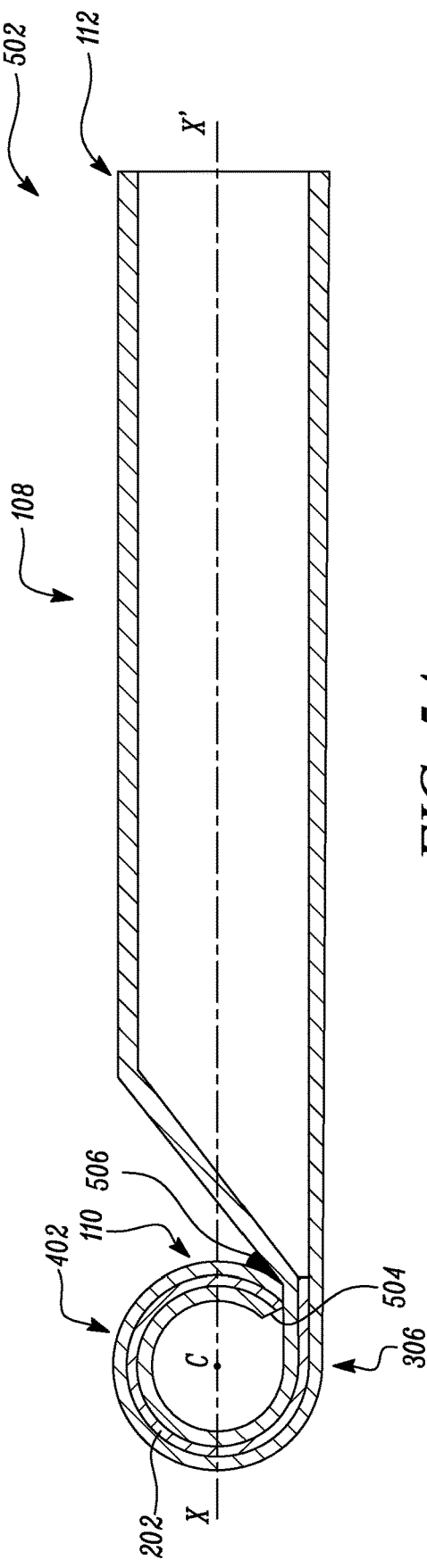
FIGS. 5A, 5B, 5C, 5D and 5E illustrate cross sectional views of exemplary damper tubes, according to an aspect of the present disclosure.
Figure 5B:
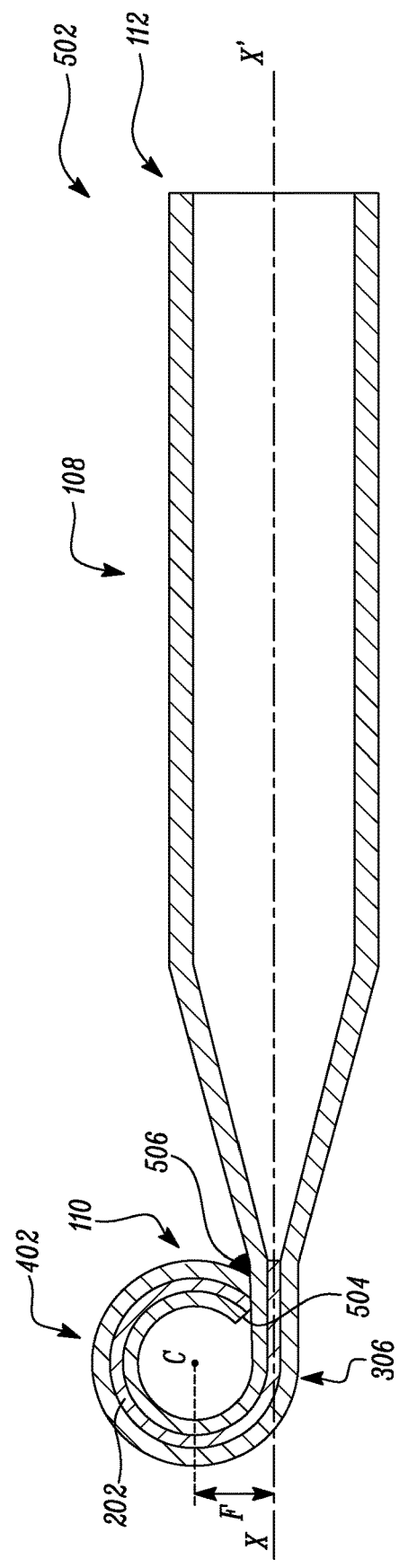

Referring to FIGS. 5A, 5B, 5C, 5D and 5E, an edge 504 of the loop 402 is connected to the tube 108. More specifically, the edge 504 of the loop 402 is connected to the tube 108 by a weld 506 in order to seal the edge 504, limit straightening of the loop 402, and/or provide structural rigidity to the loop 402. It should be noted that a length of the flattened portion 306 and/or a length of the reinforcing insert 202 may be approximately equal to a circumference of the loop 402. In some embodiments, as shown in FIG. 5A, a center "C" of the loop 402 may be aligned with respect to the central axis X-X' of the damper tube 502. In some embodiments, as shown in FIG. 5B, the center "C" of the loop 402 may be disposed at an offset "F" with respect to the central axis X-X' of the damper tube 502. Such a configuration of the loop 402 with respect to the central axis X-X' may provide increased stiffness and load bearing capacity of the loop 402 and/or the damper tube 502.

Figure 5C:
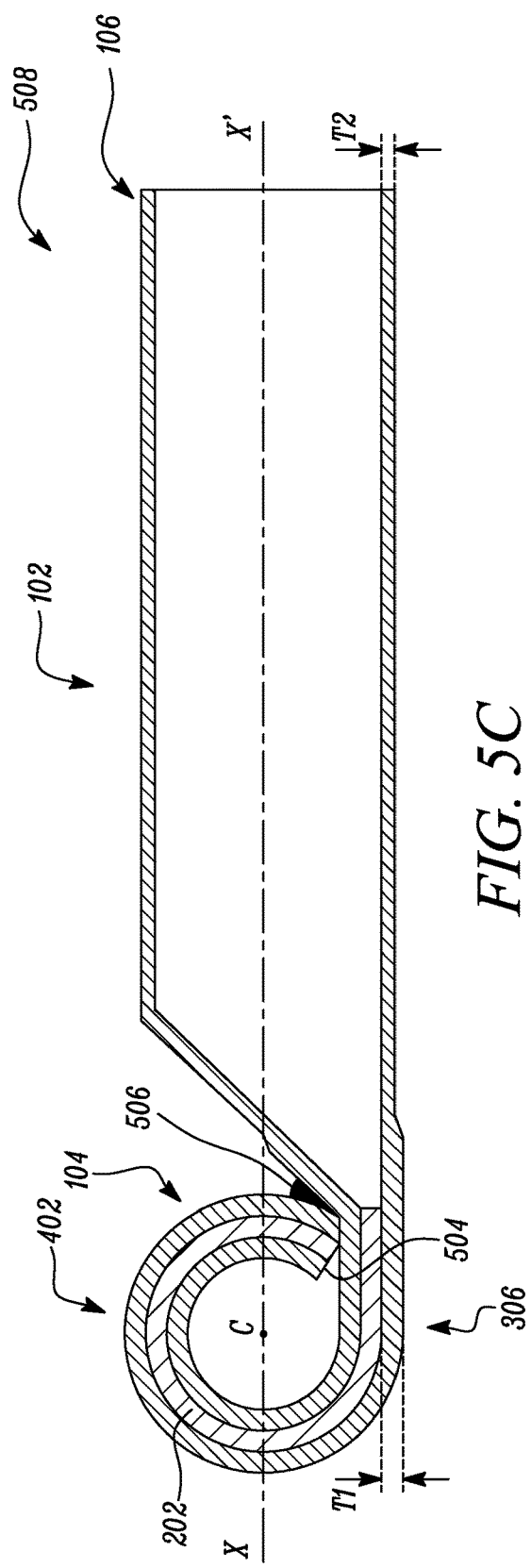

Referring to FIG. 5C, an embodiment of the damper tube 508 formed with the tube 102 having the varying thickness (as shown in FIG. 1A) is illustrated. The damper tube 508 includes a configuration and method of manufacturing substantially similar to that of the damper tube 502. It should be noted that, in the illustrated embodiment, a substantial portion of the tube 102 having the first thickness "T1" is bent into the loop 402. In other embodiments, a portion of the tube 102 bent into the loop 402 may vary based on application requirements.

Figure 5D:
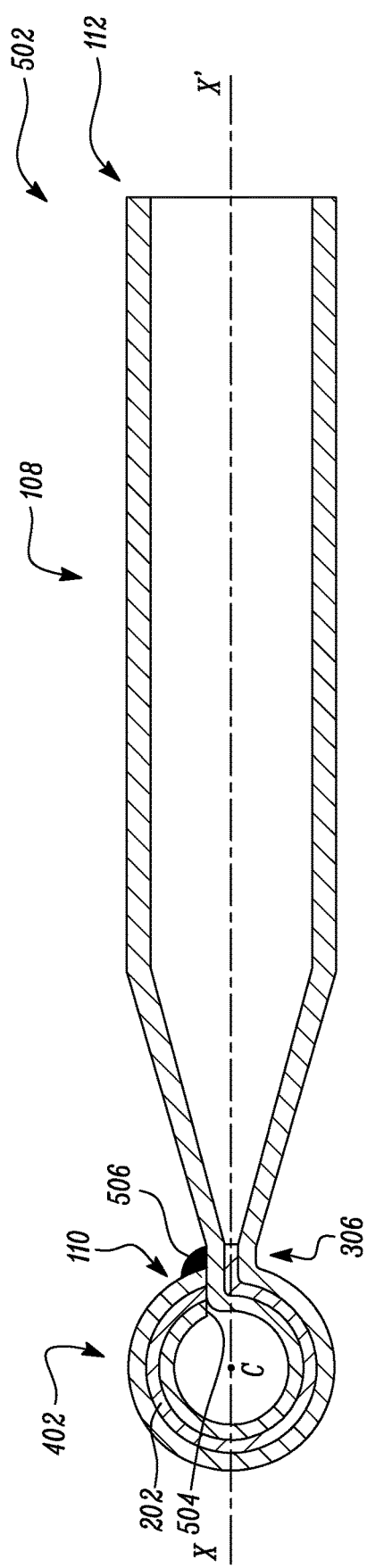
Figure 5E:
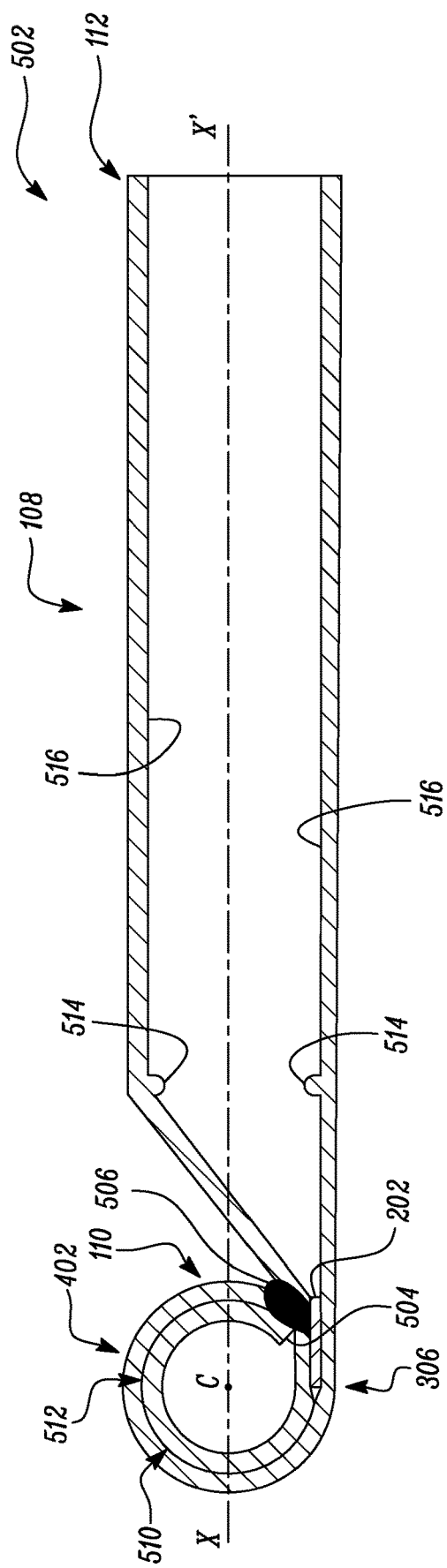

Referring to FIG. 5D, in some embodiments, each of the flattened portion 306 of the tube 108 and the center "C" of the loop 402 may be aligned with respect to the central axis X-X' of the damper tube 502. Referring to FIG. 5E, in some embodiments, the insert 202 may include a length substantially shorter than the circumference of the loop 402. In such a situation, the insert 202 may be provided in a region of maximum stress concentration. Further, the insert 202 may not be bent. Further, in some embodiments, inner surfaces 510, 512 of the loop 402 beyond the insert 202 may contact each other, as shown. Additionally, in some embodiments, the weld 506 may couple both the edge 504 and the insert 202 with the loop 402. In some embodiments, one or more notches 514 may be provided on the inner surface 516 of the damper tube 108. The notch 514 may be adapted to support a base valve (not shown) of the shock absorber.

Figure 6:
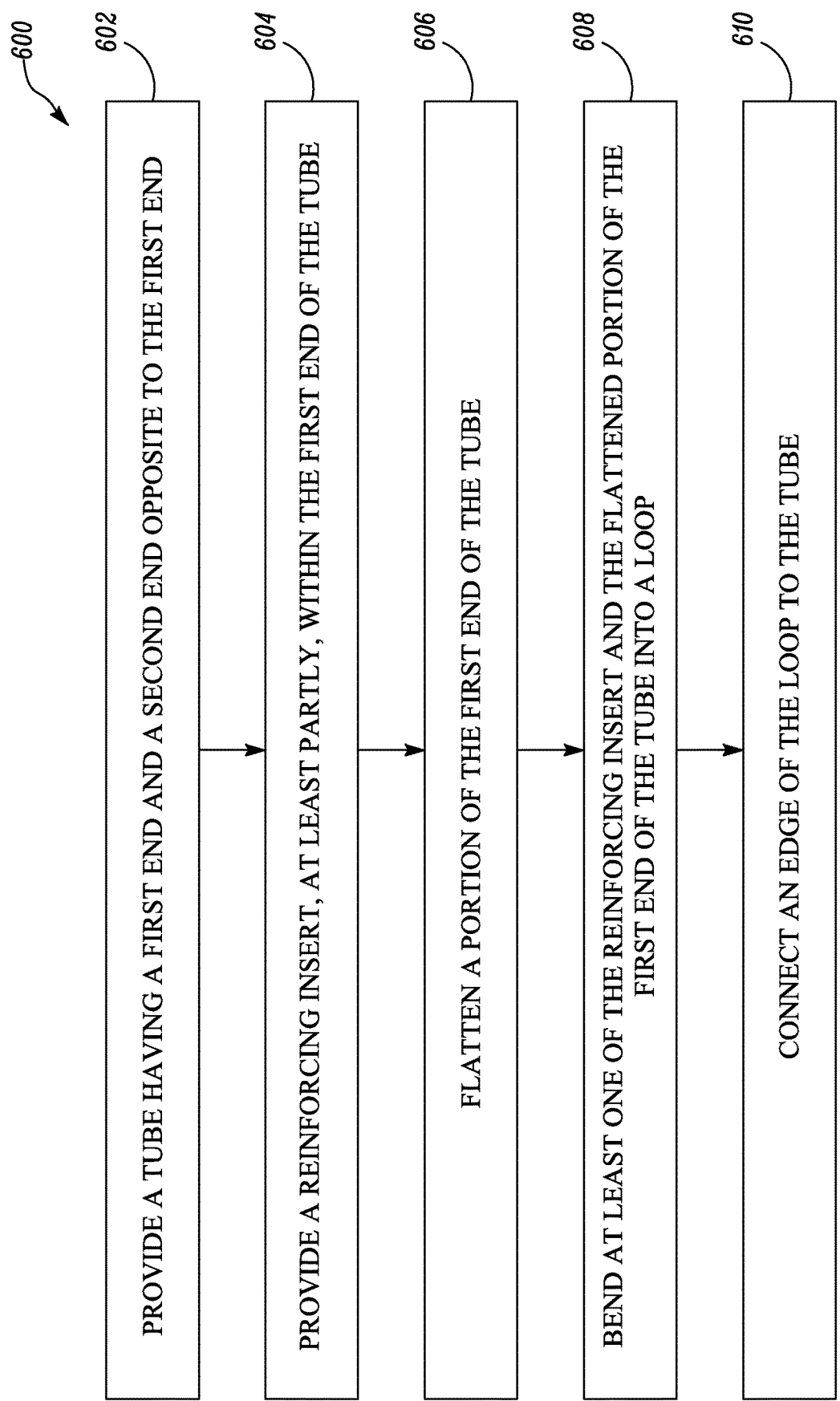
FIG. 6 illustrates a flowchart of a method of manufacturing the damper tube, according to an aspect of the present disclosure.

Referring to FIG. 6, a flowchart of a method 600 of manufacturing the damper tube 502 is illustrated. At step 602, the tube 108 having the first end 110 and the second end 112 opposite to the first end 110 is provided, as described with reference to FIG. 1B. In some embodiments, as described with reference to FIG. 1A, the tube 102 may include a first thickness "T1" of the first end 104 of the tube 102 different from the second thickness "T2" of the second end 106 of the tube 102. At step 604, the reinforcing insert 202 is provided, at least partly, within the first end 110 of the tube 108, as described with reference to FIGS. 2A and 2B.

In some embodiments, as described with reference to FIG. 2A, the reinforcing insert 202 has the substantially planar shape such that the first end 110 of the tube 108 is flattened to contact the reinforcing insert 202. In some embodiments, as described with reference to FIG. 2B, the reinforcing insert 204 has the substantially cylindrical shape such that the reinforcing insert 204 is flattened along with the first end 110 of the tube 108. At step 606, the portion of the first end 110 of the tube 108 is flattened, as described with reference to FIGS. 3A to 3E.

At step 608, at least one of the reinforcing insert 202 and the flattened portion 306 of the first end 110 of the tube 108 is bent into the loop 402, as described with reference to FIGS. 4A to 4C. More specifically, the first tool 404 is provided in contact with the reinforcing insert 202 and the flattened portion 306 of the first end 110 of the tube 108. The first tool 404 is adapted to at least partly bend the reinforcing insert 202 and the flattened portion 306 of the first end 110 of the tube 108. Further, the first tool 404 is replaced with the second tool 408 in contact with the partly bent reinforcing insert 202 and the flattened portion 306 of the first end 110 of the tube 108. The second tool 408 is adapted to bend the partly bent reinforcing insert 202 and the flattened portion 306 of the first end 110 of the tube 108 into the loop 402.

Further, the second tool 408 is removed from the loop 402 to complete the curling process. In some embodiments, the reinforcing insert 202 and the flattened portion 306 of the first end 110 of the tube 108 may be heated during the bending and/or curling process. At step 610, the edge 504 of the loop 402 is connected to the tube 108 by the weld 506, as described with reference to FIGS. 5A, 5B, 5C, 5D and 5E. In some embodiments, the center "C" of the loop 402 is aligned with respect to the central axis X-X' of the tube 108, as described with reference to FIGS. 5A, 5C, 5D and 5E. In some embodiments, the center "C" of the loop 402 is disposed at the offset "F" with respect to the central axis X-X' of the tube 108, as described with reference to FIG. 5B.

Figure 7:
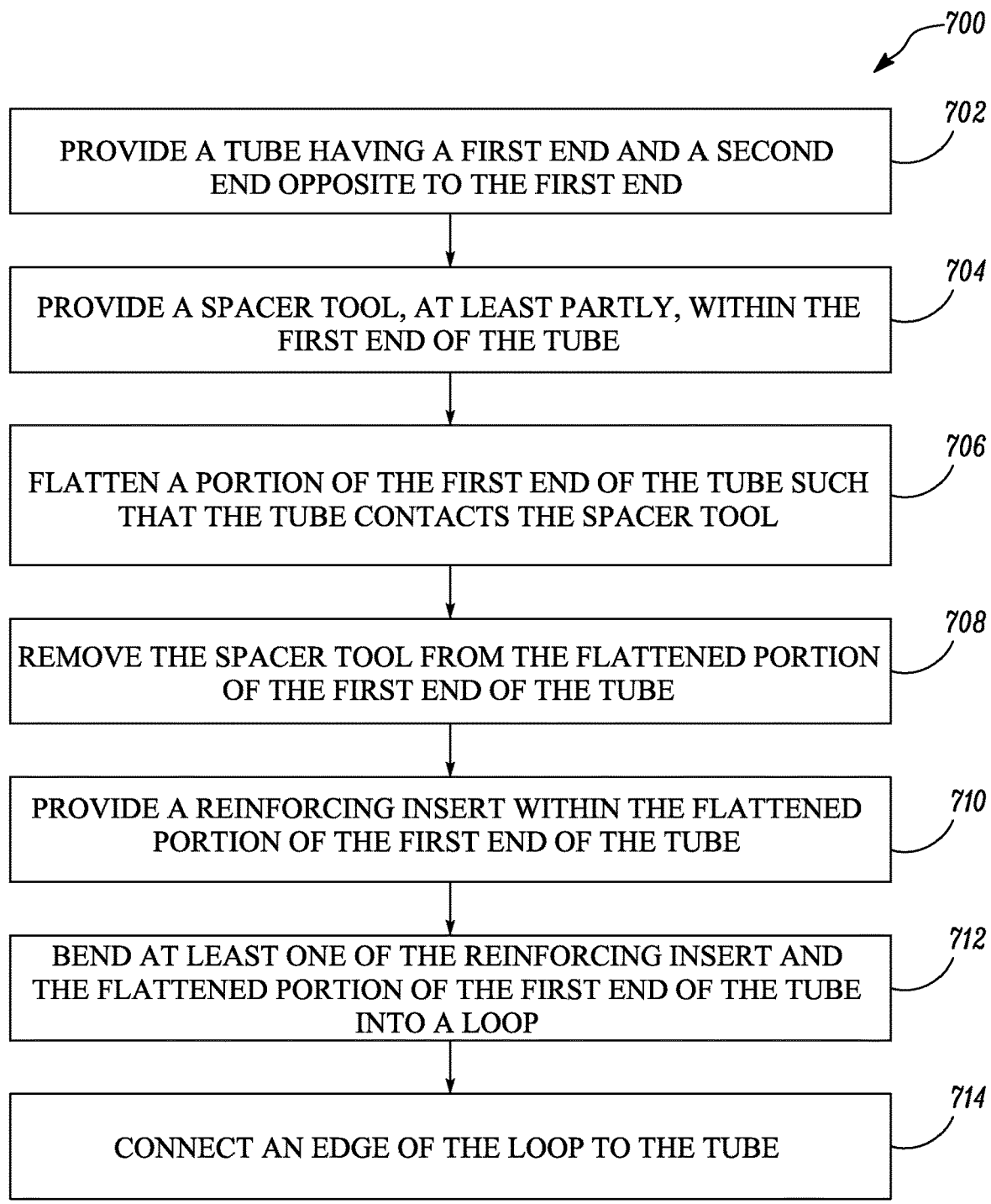
FIG. 7 illustrates a flowchart of another method of manufacturing the damper tube, according to another aspect of the present disclosure.

Referring to FIG. 7, an alternate method 700 of manufacturing the damper tube 502 is illustrated. The method 700 will now be explained with combined reference to FIGS. 1 to 8. At step 702, the tube 108 is provided having the first end 110 and the second end 112 opposite to the first end 110, as described with reference to FIGS. 1A and 1B. At step 704, and referring to FIG. 8A, a mandrel or a spacer tool 802 is provided, at least partly, within the first end 110 of the tube 108. The spacer tool 802 may be inserted from the first end 110 or the second end 112 of the tube 108. In the illustrated embodiment, the spacer tool 802 has a substantially planar shape. In other embodiments, the spacer tool 802 may have a substantially cylindrical shape. Also, in some embodiments, a width of the spacer tool 802 may be equal to an inner diameter of the tube 108 prior to flattening of the tube 108. Accordingly, the spacer tool 802 may include a metal strip, a portion of sheet metal, and the like. At step 706, and referring to FIG. 8B, the portion of the first end 110 of the tube 108 is flattened, as described with reference to FIGS. 3A to 3E, such that the tube 108 contacts the spacer tool 802.

Figure 8A:
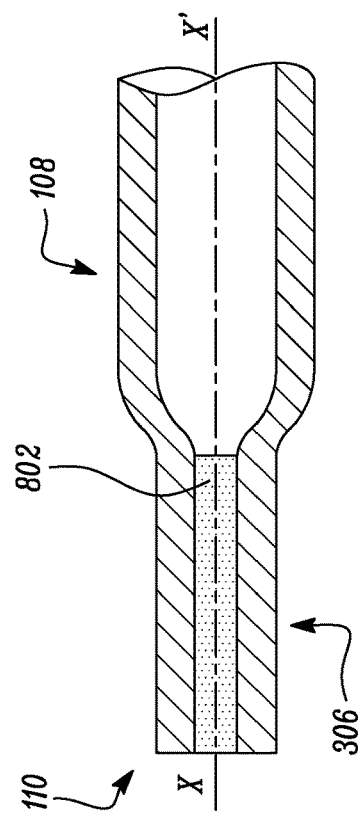
FIGS. 8A, 8B, 8C and 8D illustrate different steps of flattening the exemplary tube, according to another aspect of the present disclosure.
Figure 8B:
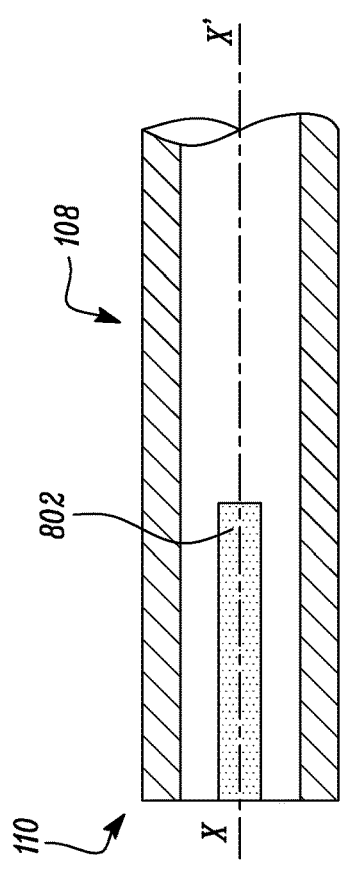
Figure 8C:
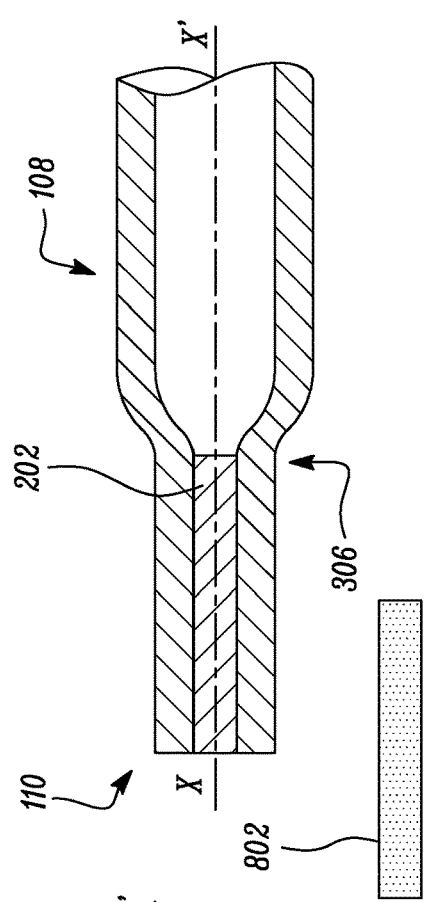
Figure 8D:
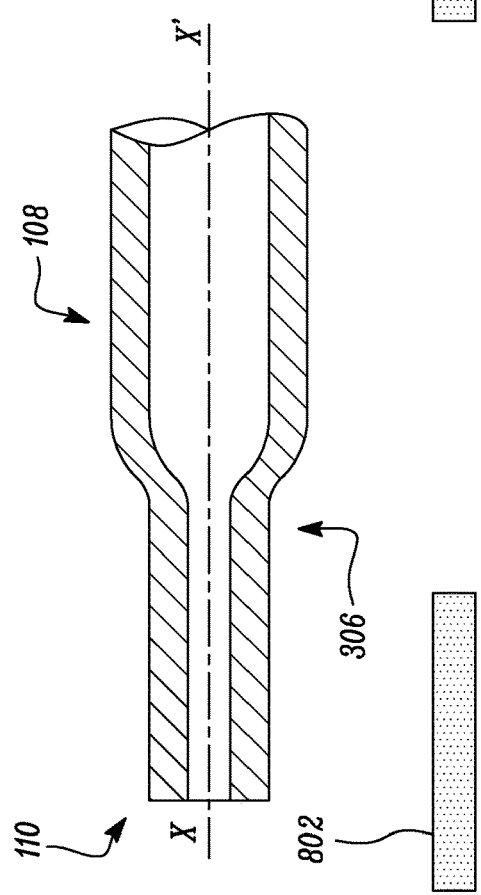

At step 708, and referring to FIG. 8C, the spacer tool 802 is removed from the flattened portion 306 of the first end 110 of the tube 108. At step 710, and referring to FIG. 8D, the reinforcing insert 202 is provided within the flattened portion 306 of the first end 110 of the tube 108. The reinforcing insert 202 has the substantially planar shape, as described with reference to FIG. 2A, such that the first end 110 of the tube 108 is flattened to contact the reinforcing insert 202. In some embodiments, the flattened portion 306 of the first end 110 of the tube 108 may be re-flattened, such that the tube 108 contacts the reinforcing insert 202 and any clearance between the reinforcing insert 202 and the flattened portion 306 of the tube 108 is removed.

At step 712, at least one of the reinforcing insert 202 and the flattened portion 306 of the first end 110 of the tube 108 are bent into the loop 402, as described with reference to FIGS. 4A to 4C. More specifically, the first tool 404 is provided in contact with the reinforcing insert 202 and the flattened portion 306 of the first end 110 of the tube 108. The first tool 404 is adapted to at least partly bend the reinforcing insert 202 and the flattened portion 306 of the first end 110 of the tube 108. Further, the first tool 404 is replaced with the second tool 408 in contact with the partly bent reinforcing insert 202 and the flattened portion 306 of the first end 110 of the tube 108.

The second tool 408 is adapted to bend the partly bent reinforcing insert 202 and the flattened portion 306 of the first end 110 of the tube 108 into the loop 402. Further, the second tool 408 is removed from the loop 402 to complete the curling process. In some embodiments, the reinforcing insert 202 and the flattened portion 306 of the first end 110 of the tube 108 may be heated during the bending and/or curling process. At step 714, the edge 504 of the loop 402 is connected to the tube 108 by the weld 506, as described with reference to FIGS. 5A, 5B, 5C, 5D and 5E.

In some embodiments, one or more tools, dies, presses, and/or machines (not shown) having similar or dissimilar working capacities may be employed in a synchronized operational configuration in order to improve productivity. The synchronized operation of the machines may be controlled via Computer Numeric Control (CNC). Additionally, or optionally, an integrated automated tool changing system (not shown) having a library of various tooling may be used in tool changing operation. In some embodiments, different machines may be operated independently in order to improve flexibility of the process. In some embodiments, the complete process may be automated, such that multiple tubes may be processed using a single operation. Moreover, completion of multiple tasks such as tube end reduction/expansion, flattening (with or without trimming), and curling may be achieved using, for example, custom work benches having combined hydraulic units.

In such situations, a controller (not shown) may be employed in order to automate the process. The controller may be communicably coupled to the one or more machines. The controller may be a control unit configured to perform various functions of the process. In one embodiment, the controller may be a dedicated control unit configured to perform functions related to the process. In another embodiment, the controller may be a Machine Control Unit (MCU) associated with the one or more machines to perform functions related to the process.

The method 600, 700 provides a simple and effective process to flatten, bend, and curl the damper tube 502, 508 by limiting operational steps, process components, and multiple joints or welds. The limitation of the joint to the single weld 506 may improve corrosion resistance and durability of the damper tube 502, 508. Also, in situations when the tube 102 with variable thickness may be used, an overall weight of the damper tube 508 may be substantially reduced while providing reinforcement at the loop 402. As such, the method 600, 700 provides a simplified structure of the damper tube 502, 508 in order to reduce manufacturing and/or assembly complexity and costs.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof

What is claimed is:

1. A method of manufacturing a damper tube, the method comprising:
providing a tube having a first end and a second end opposite to the first end;
providing a reinforcing insert, at least partly, within the first end of the tube, wherein the reinforcing insert has a planar or cylindrical shape disposed within the first end of the tube:
flattening a portion of the first end of the tube;
bending the reinforcing insert and the flattened portion of the first end of the tube into a loop; and
connecting an edge of the loop to an outer surface of the tube by welding; and
trimming an end boundary of the flattened portion.

2. The method of claim 1, wherein the bending the reinforcing insert and the flattened portion further includes providing a first tool in contact with the reinforcing insert and the flattened portion of the first end of the tube, the first tool adapted to at least partly bend the reinforcing insert and the flattened portion of the first end of the tube.

3. The method of claim 2, wherein the bending the reinforcing insert and the flattened portion further includes replacing the first tool with a second tool in contact with the at least partly bent reinforcing insert and the flattened portion of the first end of the tube, the second tool adapted to bend the at least partly bent reinforcing insert and the flattened portion of the first end of the tube into the loop.

4. The method of claim 3, wherein the bending the reinforcing insert and the flattened portion further includes removing the second tool from the loop.

5. The method of claim 4, wherein the first tool is a punch tool.

6. The method of claim 5, wherein the second tool is a curling tool.

7. The method of claim 1, wherein the bending the reinforcing insert and the flattened portion further includes heating the reinforcing insert and the flattened portion of the first end of the tube.

8. The method of claim 1, wherein the reinforcing insert has a cylindrical shape disposed within the first end of the tube such that the reinforcing insert is flattened along with the first end of the tube.

9. The method of claim 1, wherein a thickness of the first end of the tube is different from a thickness of the second end of the tube.

10. The method of claim 1, wherein a center of the loop is aligned with respect to a central axis of the tube.

11. The method of claim 1, wherein a center of the loop is disposed at an offset with respect to a central axis of the tube.

12. The method of claim 1, wherein the flattened portion of the first end of the tube is disposed at an offset ["F"] with respect to a central axis of the tube.

13. The method of claim 1, wherein the flattened portion of the first end of the tube is aligned with respect to a central axis of the tube.

14. The method of claim 1, wherein the tube is provided with a first thickness at the first end and a second thickness at the second end.

15. The method of claim 14, wherein the first thickness is greater than the second thickness.

16. The method of claim 15, wherein the first thickness extends a length of the tube at least as far as the reinforcing insert extends into the tube.

\* \* \* \* \*